United States Patent
Mittelbach

(10) Patent No.: US 12,352,092 B2
(45) Date of Patent: Jul. 8, 2025

(54) DRIVE OF A SLIDING DOOR OF A MOTOR VEHICLE

(71) Applicant: KIEKERT AKTIENGESELLSCHAFT, Heiligenhaus (DE)

(72) Inventor: Stephan Mittelbach, Velbert (DE)

(73) Assignee: Kiekert AG, Heiligenhaus (DE)

( * ) Notice: Subject to any disclaimer, the term of this patent is extended or adjusted under 35 U.S.C. 154(b) by 0 days.

(21) Appl. No.: 18/253,955

(22) PCT Filed: Jun. 17, 2021

(86) PCT No.: PCT/DE2021/100521
§ 371 (c)(1),
(2) Date: May 23, 2023

(87) PCT Pub. No.: WO2022/127964
PCT Pub. Date: Jun. 23, 2022

(65) Prior Publication Data
US 2024/0110428 A1    Apr. 4, 2024

(30) Foreign Application Priority Data

Dec. 18, 2020 (DE) .................... 10 2020 134 107.5

(51) Int. Cl.
*E05F 15/643*       (2015.01)
*E05F 15/655*       (2015.01)
*B60J 5/06*         (2006.01)

(52) U.S. Cl.
CPC .......... *E05F 15/643* (2015.01); *E05F 15/655* (2015.01); *B60J 5/06* (2013.01);
(Continued)

(58) Field of Classification Search
CPC ......... E05F 15/643; E05F 15/655; B60J 5/06; E05Y 2201/672
See application file for complete search history.

(56) References Cited

U.S. PATENT DOCUMENTS 3,834,081 A * 9/1974 Catlett .................. E05F 15/643
49/327
4,235,046 A * 11/1980 Hess ..................... E05F 11/485
49/352
(Continued)

FOREIGN PATENT DOCUMENTS

CN    104775707    *  7/2015
DE    198 16 563   *  7/1999
(Continued)

OTHER PUBLICATIONS

International Search Report mailed Sep. 28, 2021, for priority International Application No. PCT/DE2021/100521.

*Primary Examiner* — Gregory J Strimbu
(74) *Attorney, Agent, or Firm* — Renner, Otto, Boisselle & Sklar, LLP

(57) ABSTRACT

A drive of a sliding door of a motor vehicle, comprising an electric drive unit, a drive cable, a guide for the drive cable, the sliding door being movable relative to a body by operation of the drive cable, and a cable deflection having a deflection wheel which is rotatably mounted in the cable deflection, wherein the cable deflection is adjustable to adjust a position of the deflection wheel to adjust a tensile stress in the drive cable.

13 Claims, 1 Drawing Sheet

(52) U.S. Cl.
CPC ..... *E05Y 2201/66* (2013.01); *E05Y 2201/672* (2013.01); *E05Y 2600/14* (2013.01); *E05Y 2600/62* (2013.01); *E05Y 2900/531* (2013.01)

(56) References Cited

U.S. PATENT DOCUMENTS

| | | |
|---|---|---|
| 7,331,141 B2 | 2/2008 | Gilchrist |
| 10,562,381 B2 | 2/2020 | Haubs et al. |
| 2008/0222959 A1 | 9/2008 | Blomqvist |
| 2015/0197974 A1 | 7/2015 | Suzuki et al. |
| 2023/0003070 A1* | 1/2023 | Finke .................... E05F 15/643 |

FOREIGN PATENT DOCUMENTS

| | | | |
|---|---|---|---|
| DE | 20310038 U1 | | 11/2004 |
| DE | 102006046602 A1 | | 4/2008 |
| DE | 102015115222 A1 | | 3/2017 |
| EP | 2439369 A2 | | 4/2012 |
| JP | H0441081 U | | 4/1992 |
| KR | 10-1306886 | * | 9/2013 |
| WO | WO 2021/245188 | * | 12/2021 |

* cited by examiner

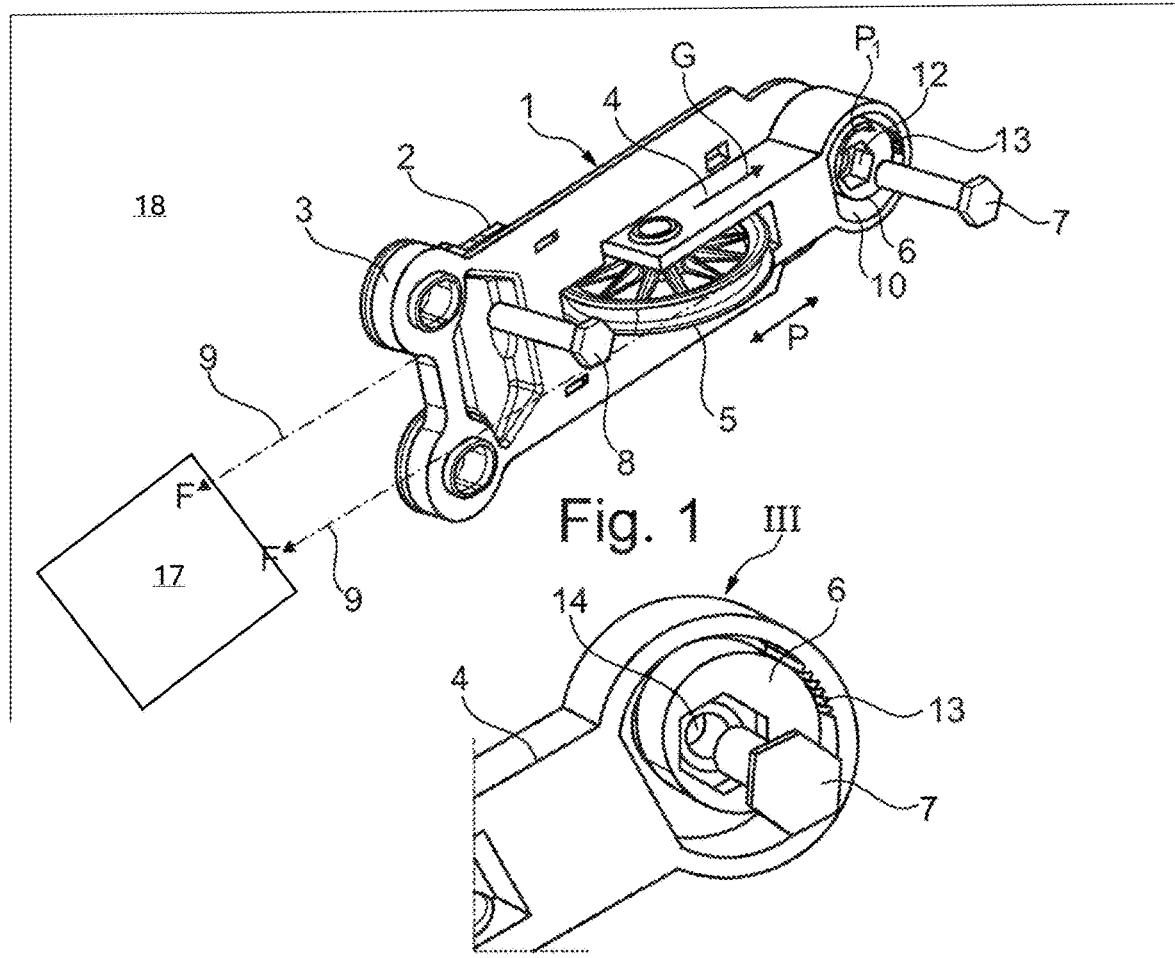
Fig. 1
Fig. 2
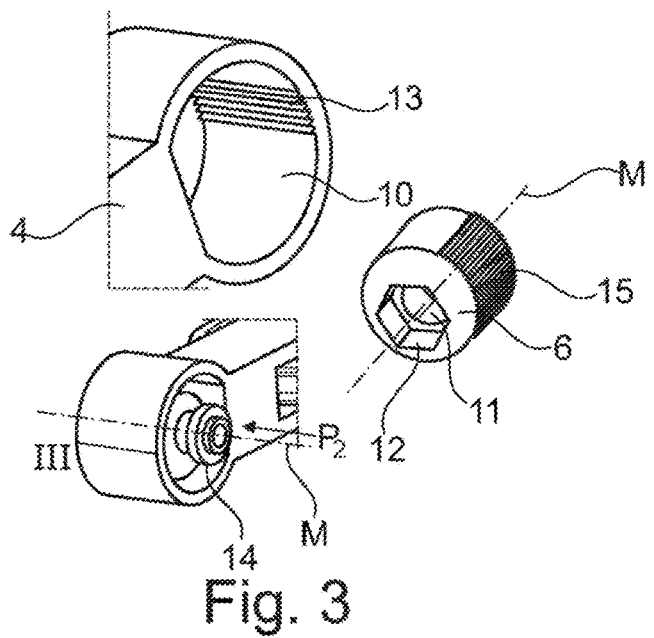
Fig. 3

DRIVE OF A SLIDING DOOR OF A MOTOR VEHICLE

This application is a national phase of International Patent Application No. PCT/DE2021/100521 filed Jun. 17, 2021, which claims priority to German Patent Application No. 10 2020 134 107.5 filed Dec. 18, 2020, each of which is hereby incorporated herein by reference in its entirety.

FIELD OF DISCLOSURE

The invention relates to a drive of a sliding door of a motor vehicle comprising an electric drive unit, a drive cable, a guide for the drive cable, the sliding door being movable relative to a body by means of the drive cable, and a cable deflection having a deflection wheel which is rotatably mounted in the cable deflection.

BACKGROUND OF DISCLOSURE

In order to facilitate the operation of a sliding door in a motor vehicle, in particular in order to facilitate operation for children, for example, sliding doors are equipped with drives, so that only an initialization must take place in order to open or close the sliding door. In this case, an initialization can take place by means of a radio remote control or a push button or switch. In most cases, the sliding door is then closed or opened by means of an electric drive. The sliding door usually slides in guide rails along the motor vehicle and moves relative to the body.

Since the sliding doors also release and close large openings, such as in transporters, a corresponding drive must be provided having a corresponding power, and in addition it must be ensured that the means for driving the sliding door can correspondingly transmit this force. If, on the one hand, the force transmission and provision is important, on the other hand a guidance of the force transmission means and its installation in the motor vehicle is also an important component for a permanent function of the sliding door. In order to meet these requirements, various drive systems and assembly designs have become known.

For example, DE 10 2006 046 602 A1 discloses a drive for a sliding door for a motor vehicle, the sliding door being movable along a guide track by means of a drive cable. The drive cable is wound and unwound by means of an electric motor transmission unit and a cable drum. In this case, a respective end of the drive cable pulls the sliding door either in the opening or in the closing direction. In order to enable a proper application of force in both directions of movement, the drive cable is guided over deflection devices. The respective drive cable is deflected at the deflection devices, in order then to dip into the guide track. The drive unit and the deflection devices located at the respective ends of the drive unit are designed as a unitary assembly so that a reliable deflection as well as a provision of the necessary force for moving the sliding door is made possible.

In order to enable a reliable deflection of the forces required for the movement of the sliding doors, a drive of a sliding door of a motor vehicle has become known from DE 10 2015 115 222 A1, comprising an electric drive unit, a drive cable and a guide for the drive cable, the drive unit, the drive cable and the guide being accommodated in a body of the motor vehicle in a fixed manner, and the sliding door being movable relative to the body by means of the drive cable. In this case, the drive is characterized in that the cable deflection of the drive cable is of modular design and the drive cable can be deflected via the modular cable deflection. In the cable deflection, a deflection roller is fixedly accommodated in a shaft of a base plate.

Since the distances, that is to say the path of the movement of the sliding door, can also be long in the case of large doors, it is necessary, depending on the embodiment and width or size of the sliding door, to mount at least one deflection device at a large distance from the drive unit, in the motor vehicle. In order to be able to move the sliding door reliably and above all without jerking, a basic tension must be provided in the drive cable, it also being necessary for this tension in the drive cable to be ensured over the entire service life of the motor vehicle.

One problem with the development of sliding door drives is that, on the one hand, sufficient force must be provided and, on the other hand, the force must be properly transmitted onwards to the sliding door to be moved. It is essential here that a sufficient tensile stress is available in the drive cable, and that this tensile force can be ensured over the service life of the motor vehicle. In particular, wear in the components of the guide for the drive cable and the cable deflection can cause the tensile stress in the drive cable to decrease, as a result of which a discontinuous movement of the sliding door can occur. This is where the invention starts from.

The object of the invention is to provide an improved sliding door drive. In addition, the object of the invention is to provide a sliding door drive for a motor vehicle, which ensures a reliable and smooth movement of the sliding door over the service life of the motor vehicle. Furthermore, a structurally simple and cost-effective possibility for driving the sliding door is to be provided.

The object is achieved detection device by the features of independent claim 1. Advantageous embodiments are specified in the dependent claims. It should be noted, however, that the embodiments described below are not limiting; rather, any possible variations of the features described in the description, the dependent claims and the drawings are possible.

According to claim 1, the object of the invention is achieved in that a drive of a sliding door of a motor vehicle is provided, comprising an electric drive unit, a drive cable, a guide for the drive cable, the sliding door being movable relative to a body by means of the drive cable, and a cable deflection having a deflection wheel rotatably mounted in the cable deflection and a fastening means for the cable deflection, the fastening means being able to be used as an adjustment means for the deflection wheel. The design according to the invention of the drive unit of the sliding door now makes it possible to provide an improved sliding door drive which is able to adjust the tensile stress in the drive cable.

As a result of the possibility of using the cable deflection as a means for adjusting the tensile stress, the tensile stress in the drive cable can also be designed to be adjustable in the event of an impact, wear or increased tolerances. Aging-related or tolerance-related reductions in the tensile stress of the drive cable can thus be eliminated. In particular, this is possible using the simplest structural means, since the fastening means itself is part of the adjustment means for the cable tension. In this case, the fastening means is designed in such a way that on the one hand the cable deflection can be fastened to the motor vehicle body and, on the other hand, the tensile stress in the drive cable can be varied by means of the fastening means. This is also advantageous because installation tolerances of the drive can be eliminated by means of the adjustment means.

According to the invention, the drive of a sliding door of a motor vehicle is considered to be an electromotive drive which is capable of guiding, winding and driving a drive cable in such a way that a sliding door is thus moved, in a guide track, along and in relation to a body of a motor vehicle. Preferably, the drive is equipped with a transmission, and more preferably with a planetary transmission, so that a force necessary for the movement of the sliding door can be provided.

Furthermore, the use of a planetary transmission offers the possibility of decoupling the electric drive from the cable and thus from the sliding door. This can be advantageous, for example, if the sliding door should be or has to be moved manually in the event of a power failure. Advantageously, an electric drive in the form of an electric motor is expedient, since electrical energy is available in the motor vehicle.

A drive cable is used as the drive means. A drive cable offers the advantage that it can be easily deflected and, for example, can be guided in a guide tube through the body in the direction of the deflection device. Furthermore, the use of a guide or drive cable offers a cost-effective design solution in order to adapt the electric drive unit to different designs and sizes of the sliding door. If, for example, a drive is used and the drive is implemented for doors of different widths, that is to say of different sized openings in the motor vehicle, only a part of the guide of the cable must be replaced and the length of the cable adapted. It is thus easy to adapt the drive unit to different requirements.

In the cable deflection, the drive cable is deflected such that a connection to the door to be driven can be established. It is assumed here that the sliding door drive is fixedly mounted in the body of the motor vehicle, and the cable ends of the sliding door drive emerge from the body in order to be able to be connected to the sliding door that is movably mounted on the motor vehicle. In this embodiment, the cable deflections or the cable deflection spaced apart from the drive are fixedly mounted in the body. Depending on the embodiment, a separate cable deflection that is spaced apart from the drive can be provided, but, depending on the structural design of the body, two cable deflections spaced apart from the drive can also be provided in the motor vehicle. The sliding door drive is preferably mounted in the body of the motor vehicle. Of course, it is also possible to mount the sliding door drive in the sliding door and to connect the cable ends of the drive cable to the body, in order to enable an electrical displacement or movement of the sliding door.

The cable deflection carries the deflection wheel and holds the deflection wheel firmly with respect to the body or the sliding door. In this case, the tensile stress in the drive cable can be adjusted by means of the adjustable mounting, according to the invention, of the deflection wheel.

It can be advantageous here if the deflection wheel is accommodated in a separate bearing means. The separate mounting of the deflection wheel in the cable deflection offers the possibility of moving the bearing means in the cable deflection. The cable deflection preferably has at least one base plate in which the deflection wheel is held. If the deflection wheel is now mounted and rotatably received in the separate bearing means, it is possible to displace the bearing means with respect to the base plate. For this purpose, the bearing means can be accommodated displaceably in the cable deflection. It is of course also conceivable to provide a pivotably movable adjustability by means of the cable deflection, for which purpose, for example, the shaft for mounting the deflection wheel can be guided in a groove of the base plate. If, for example, the base plate is provided with two elevations, as a result of which the elevations have openings through which the shaft of the deflection wheel can be mounted, it can be possible to realize a displaceability of the bearing means in the cable deflection by the formation of slots in the elevations. The bearing means can thus be adjustably received in the cable deflection in relation to a base plate of the cable deflection. In this case, depending on the contour of the slots, a linear, but also curved, displacement of the bearing means can be made possible.

In an advantageous development of the invention, the bearing means can be fixed to the motor vehicle by means of the fastening screw. The bearing means forms a part of the cable deflection, the bearing means supports or mounting the deflection wheel. In this case, according to the invention, the bearing means itself can be fixed by means of the fastening screw, so that on the one hand the cable deflection and at the same time the bearing means can be fixed with respect to the motor vehicle body by means of the fastening screw. The fastening screw thus has a double function. On the one hand, the cable deflection is fastened as a whole to the motor vehicle by means of the fastening screw and, on the other hand, the fastening screw serves as a securing means for fixing the position of the bearing means or the deflection wheel. In this case, the fastening screw can advantageously be inserted into the cable deflection in the direction of the further fastening screws for the cable deflection. In other words, a fastening from one assembly direction for all fastening screws can be implemented structurally.

This offers an advantage in particular in series assembly.

If data memory bearing means can be positioned by means of an eccentric, a further embodiment of the invention results. Using an eccentric makes it possible to design the bearing means so as to be steplessly adjustable. By means of the eccentric, the bearing means can be displaced in the base plate or relative to the base plate. In this case, the eccentric is arranged in the cable deflection in such a way that, when the eccentric is twisted or when the eccentric is adjusted, the bearing means is displaced with respect to the base plate, whereby at the same time a tensile stress in the drive cable can be varied.

If the eccentric is fixable by means of the fastening screw, a further advantageous embodiment of the invention can be achieved. By fastening the eccentric directly by the fastening screw for the bearing means, an adjustability for the deflection wheel can be realized with a minimum number of structural components. The fastening screw thus secures the position of the bearing means, at the same time the eccentric being fixed in the bearing means. Consequently, the eccentric, the bearing means and the base plate of the cable deflection are fastened and fixed to the motor vehicle by means of the fastening screw. Thus, the smallest possible number of components is required in order to provide an adjustment means for the deflection wheel in the cable deflection.

If the eccentric can be brought into engagement with the bearing means in a form-fitting manner, such that a locking means can be generated, then a further advantageous embodiment of the invention can be achieved. In this embodiment, the eccentric is oriented in relation to the bearing means in such a way that a form-fitting connection between the eccentric and the bearing means can be made possible. In this case, the eccentric can be inserted, for example, into an opening of the bearing means and, depending on the orientation of the eccentric, the position of the bearing means can be adjusted.

If there is now a form-fitting connection between the eccentric and the bearing means, this form-fitting connection can be used for securing the position of the eccentric during adjustment. If the cable deflection is mounted on the motor vehicle, for example the base plate being fastened to the body by means of two further fastening screws, then the bearing means, that is to say the receptacle of the deflection wheel, can be adjusted with respect to the base plate by means of the eccentric. The tensile stress in the drive cable can consequently be set. If, in this position, in which the base plate is mounted on the motor vehicle, the eccentric is now adjusted and the bearing means thus aligned, then a preliminary fixing of the position of the eccentric can be achieved by means of the form-fitting connection between the eccentric and the bearing means. The form-fitting connection can be used in this case as a securing means for adjusting and holding the adjusted position of the eccentric.

In an advantageous embodiment of the form-fitting connection, a latching contour is arranged between the eccentric and the bearing means. The latching contour can be formed, for example, from a toothed profile, so that latching is made possible between the eccentric and the bearing means. If the eccentric is adjusted, and the bearing means for the deflection wheel thus adjusted, by means of a tool, for example a hex key, the latching contour can latch in between the eccentric and the bearing means and hold the eccentric in position. The latching contour thus provides a securing means during the adjustment and mounting of the cable deflection.

In an advantageous manner, the latching contour can be arranged circumferentially on the eccentric, at least In regions. By arranging a latching contour, in particular a latching contour in the form of a toothing, a reliable locking of the eccentric in engagement with the bearing means can take place. In this case, the eccentric can be adjusted during the adjustment of the tensile stress on the drive cable, the eccentric engaging in a corresponding contour of the bearing means and remaining in the adjusted position by means of the latching contour. A reliable adjustment of the eccentric over the entire adjustment range of the eccentric can be ensured by the peripheral or at least regionally peripheral latching contour.

SUMMARY OF DISCLOSURE

An additional securing results in that, according to the invention, the eccentric can be fixed in the cable deflection by means of a clamping sleeve. The eccentric can be adjusted during the assembly of the cable deflection by means of a tool, in such a way that an optimal tensile stress is present in the drive cable. By means of for example a latching contour, this position can be reliably maintained during the final assembly. In order to achieve further reliability when fixing the bearing means, it is proposed according to the invention to fix the eccentric in its position by means of a clamping sleeve. In this case, the clamping sleeve can engage, for example, in a fastening opening of the eccentric and clamp the position of the eccentric during the mounting of the cable deflection and fastening of the cable deflection by means of the fastening screw. The eccentric is thus fixed in its position both by the fastening means and by the latching contour, and moreover by means of the clamping sleeve. The position of the eccentric can thus be secured in triplicate. An adjustment of the eccentric during operation of the sliding door can thus be reliably prevented.

If the eccentric has an engagement contour, in particular an engagement contour for a tool, a structurally simple solution of the invention is thus made possible. An engagement contour on the eccentric enables easy adjustment of the bearing means. It is conceivable here that the eccentric has on the one hand a through-bore, through which the fastening means can be screwed. Furthermore, the through-bore can have a contour into which a tool can engage. In the simplest case, this is a depression which forms a hexagon, or just an elevation into which a tool can engage. A tool can be, for example, a wrench or a ratchet nut. As a result, the eccentric is easily adjustable and at the same time the advantage is achieved that the eccentric, as well as the fastening means, can be adjusted or mounted from an identical direction. The design according to the invention makes it possible to adapt the drive cable in relation to the present tension in the drive cable, it being possible to work with the smallest possible structural means and in part with existing fastening means.

BRIEF DESCRIPTION OF DRAWINGS

The invention is explained in more detail below with reference to the accompanying drawings on the basis of a preferred embodiment. However, the principle applies that the embodiment does not limit the invention, but is merely an advantageous embodiment. The features shown can be implemented individually or in combination with further features of the description as well as the claims—individually or in combination.

In the figures:

FIG. 1 is a three-dimensional view of a cable deflection, designed according to the invention, of a drive of a sliding door;

FIG. 2 is a separate view of the bearing means in the region of the eccentric, comprising a clamping sleeve and a fastening means; and FIG. 3 is a separate view of the bearing means and of the eccentric, and a rear view of the bearing means comprising the eccentric and clamping sleeve.

DETAILED DESCRIPTION

FIG. 1 shows a cable deflection 1 for a drive of a sliding door 17 of a motor vehicle 18, including an upper part 2, a base plate 3, a bearing means 4, a deflection wheel 5 rotatably received in the bearing means 4, an eccentric 6, and two fastening means 7, 8. The cable deflection 1 is shown as a detached structural unit of a body of the motor vehicle 18, the profile of the drive cable 9 having been shown as a dash-dotted line and by way of example in FIG. 1. By means of the drive cable 9, a tensile force F is introduced into the deflection wheel 5 and thus into the bearing means 4. The tensile force F counteracts a counterforce G, the forces F, G being able to be adjusted by means of the adjustment of the eccentric 6.

As can be clearly seen from the embodiment, the eccentric 6 is accommodated in an interior 10 of the bearing means 4. The eccentric has a bore, in particular a through-bore 11, which can be seen more clearly in FIG. 3. Corresponding to the through-bore 11 in the eccentric 6, an engagement means 12 is formed in the eccentric, the engagement means 12 being designed in this embodiment as a hexagonal depression in the eccentric 6. The engagement means 12 and the bore 11 have a common central axis M.

If the cable deflection 1 is now mounted in the motor vehicle, the base plate 3 can first be fastened to the body by means of the fastener 8. The base plate 3 then rests on the body in a fixed manner. In order now to adjust the tensile stress F in the drive cable 9 to a desired amount, the bearing means 4 can be displaced in the direction of the arrow P by means of the eccentric 6, and the tensile stress F in the drive cable 9 can thus be adjusted. For this purpose, a tool can engage in the engagement contour 12 of the eccentric 6 and rotate the eccentric in the direction of the arrow P1, for example. In this case, a latching contour 13 on the bearing means 4, as well as on the eccentric 6, prevent the eccentric 6 automatically readjusting after an adjustment of the tensile stress F.

FIG. 2 is an enlarged view of the bearing means 4 In the region of the eccentric 6. It can be seen that a clamping sleeve 14 has been inserted into the bore 11, the clamping sleeve 14 having been inserted into the through-bore 11 on a side opposite the engagement contour 12. If the eccentric is now positioned with the aid of a tool, then the latching contour 13 holds the eccentric 6 in its set position. If the bearing means 4 is then also fastened to the motor vehicle body by means of the fastening screw 7, then the bearing means 4 and the eccentric 6 are pressed against the body. Preferably, a cover (not shown) overlaps the bearing means 4 and the eccentric 6, as a result of which the bearing means 4 and the eccentric 6 are pressed against the body by means of the fastening screw 7. A force-fitting connection takes place between the fastening screw 7, the eccentric 6 and the bearing means 4. When the fastening means 7 is screwed on, the clamping sleeve 14 is simultaneously pressed into the through-bore 11, so that the eccentric 6 can additionally be fixed in its position. The clamping sleeve 14 thus serves as a further securing means during mounting of the cable deflection.

FIG. 3 shows a further enlargement of the bearing means 4 in the region of the receptacle of the eccentric 6. In this case, the interior 10 of the opening of the bearing means 4 can be clearly seen, a latching contour 13, which is attached in some regions, in the interior 10 of the bearing means 4 likewise being visible. A latching contour 15 on the eccentric 6 interacts with the latching contour 13 in the interior 10 of the bearing means, such that a form-fitting connection between the bearing means 4 and the eccentric 6 can be achieved.

In order to further illustrate the invention, FIG. 3 shows a view from the direction of arrow III from FIG. 2. The position of the clamping sleeve 14 can be seen, the clamping sleeve 14 in turn extending symmetrically about the center line M of the eccentric 6. During tightening of the fastening means 7, the clamping sleeve is pressed into the eccentric 6 in the direction of the arrow P2. The clamping sleeve 14 additionally fixes the position of the eccentric 6, and thus forms a securing means for maintaining a tensile stress F in the drive cable 9. By means of the design according to the invention and the interaction between the bearing means 4 and the eccentric 6, an adjustment of the tensile stress F in the drive cable 9 can be achieved with minimal structural means.

LIST OF REFERENCE SIGNS

1 cable deflection
2 upper part
3 base plate
4 bearing means
5 deflection wheel
6 eccentric
7, 8 fastening means
9 drive cable
10 interior
11 bore
12 engagement means
13, 15 latching contour
14 clamping sleeve
F tensile force
G counterforce
M center axis
P, P1, P2 arrow

The invention claimed is:

1. A drive of a sliding door of a motor vehicle, comprising:
   a drive cable,
   the sliding door being movable relative to a body of the motor vehicle by operation of the drive cable, and
   a cable deflection including:
      a base plate;
      a separate bearing that is movable in the cable deflection;
      a deflection wheel which is rotatably mounted in the cable deflection, wherein the deflection wheel is accommodated in the separate bearing, wherein the separate bearing is adjustable with respect to the base plate to adjust a position of the deflection wheel to adjust a tensile stress in the drive cable; and
      a fastener extending through the base plate and the separate bearing to secure the base plate and the separate bearing on the motor vehicle;
   wherein the bearing is positioned by an eccentric relative to the base plate and is adjusted to displace the bearing.

2. The drive of a sliding door according to claim 1, wherein the eccentric is fixed on the motor vehicle by the fastener screw.

3. The drive of a sliding door according to claim 1, wherein the eccentric is brought into locking engagement with the bearing to lock the bearing in position.

4. The drive of a sliding door according to claim 1, wherein the eccentric and the bearing include opposing latching contours.

5. The drive of a sliding door according to claim 4, wherein a first one of the latching contours is arranged circumferentially on the eccentric and a second one of the latching contours is arranged on an interior of the bearing and is engageable with the first latching contour.

6. The drive of a sliding door according to claim 5, wherein the latching contours comprises toothing.

7. The drive of a sliding door according to claim 1, further comprising a clamping sleeve, wherein the clamping sleeve is pressed against the eccentric when the fastener secures the base plate and the separate bearing on the motor vehicle.

8. The drive of a sliding door according to claim 1, wherein the eccentric has an engagement contour configured to engage with a tool.

9. The drive of a sliding door according to claim 8, wherein the engagement contour comprises a hexagonal depression.

10. The drive of a sliding door according to claim 1, wherein the base plate has two elevations and the deflection wheel is disposed between the two elevations, and the bearing is displaced by moving relative to the two elevations.

11. The drive of a sliding door according to claim 1, wherein the base plate includes a slot and the deflection wheel extends through the slot.

12. The drive of a sliding door according to claim 1, wherein the eccentric is positioned in an interior of the bearing.

13. The drive of a sliding door according to claim 1, wherein the cable deflection further includes a second fastener to secure the base plate on the motor vehicle, and wherein the fastener and the second fastener extend through the base plate in the same direction when the base plate is secured on the motor vehicle.

\* \* \* \* \*